United States Patent [19]

Tsuchiya

[11] Patent Number: 5,739,519
[45] Date of Patent: Apr. 14, 1998

[54] INFORMATION RECORDING METHOD

[75] Inventor: Keiji Tsuchiya, Kawasaki, Japan

[73] Assignee: Canon Kabushiki Kaisha, Tokyo, Japan

[21] Appl. No.: 736,137

[22] Filed: Oct. 24, 1996

Related U.S. Application Data

[63] Continuation of Ser. No. 334,332, Nov. 2, 1994, abandoned.

[30] Foreign Application Priority Data

Nov. 5, 1993 [JP] Japan .................. 5-299067

[51] Int. Cl.$^6$ .................................... G06K 7/10
[52] U.S. Cl. .................... 235/456; 235/454; 369/58
[58] Field of Search .................. 369/58, 59; 235/454, 235/456

[56] References Cited

U.S. PATENT DOCUMENTS

| | | | |
|---|---|---|---|
| 4,016,603 | 4/1977 | Ottesen | 360/135 |
| 4,603,382 | 7/1986 | Cole | 395/250 |
| 4,748,561 | 5/1988 | Brown | 364/300 |
| 5,107,481 | 4/1992 | Miki | 369/59 |
| 5,285,436 | 2/1994 | Moribe | 369/58 |
| 5,293,565 | 3/1994 | Jaquette | 369/32 |
| 5,298,730 | 3/1994 | Rokutan | 235/476 |
| 5,442,614 | 8/1995 | Tamegai | 369/58 |

FOREIGN PATENT DOCUMENTS

| | | | |
|---|---|---|---|
| 0303377 | 2/1989 | European Pat. Off. | G11B 7/007 |
| 0532356 | 3/1993 | European Pat. Off. | G11B 27/10 |
| 0559468 | 9/1993 | European Pat. Off. | G11B 20/18 |
| 4-83055 | 3/1992 | Japan . | |

*Primary Examiner*—Donald T. Hajec
*Assistant Examiner*—Karl Frech
*Attorney, Agent, or Firm*—Fitzpatrick, Cella, Harper & Scinto

[57] ABSTRACT

An information recording method in which a recording start position of a data section in which file data of a recording medium such as an optical card has been recorded is calculated on the basis of a directory for managing a file of the information recording medium recorded in a directory section and, when the data has been recorded at the calculated recording start position, a retry operation to judge whether the data has been recorded at the next recording position or not is repeated a predetermined number of times, thereby retrieving the final recording position of the data section. When the final recording position of the data section cannot be detected even if the retry operation was repeated the predetermined number of times, the information indicative of the recording position at which the retry operation was finally executed is recorded to the directory section. When performing the retry operation again, the retry operation is executed from the recording position at which the retry operation was finally performed on the basis of the information indicative of the recording position at which the retry operation was finally executed.

4 Claims, 13 Drawing Sheets

FIG. 3A
PRIOR ART

| BYTE | |
|---|---|
| 0~3 | HEADER "DIRU" |
| 4~5 | SYSTEM DIRECTORY NUMBER |
| 6~7 | USER DIRECTORY NUMBER |
| 8~9 | START LOGICAL SECTOR ADDRESS |
| 10~11 | NUMBER OF MANAGEMENT LOGICAL SECTORS |
| 12~13 | START PHYSICAL SECTOR ADDRESS |
| 14~15 | NUMBER OF MANAGEMENT PHYSICAL SECTORS |
| 16~19 | DEFECT LIST 1 DEFECT START ADDRESS NUMBER OF CONTINUOUS DEFECT SECTORS |
| 20~23 | DEFECT LIST 2 DEFECT START ADDRESS NUMBER OF CONTINUOUS DEFECT SECTORS |
| 24~27 | DEFECT LIST 3 DEFECT START ADDRESS NUMBER OF CONTINUOUS DEFECT SECTORS |
| 28~59 | USER DIRECTORY DATA |

FIG. 3B
PRIOR ART

| BYTE | |
|---|---|
| 0~3 | HEADER "DIRS" |
| 4~5 | SYSTEM DIRECTORY NUMBER |
| 6~7 | RESERVATION |
| 8~9 | START LOGICAL SECTOR ADDRESS |
| 10~11 | NUMBER OF MANAGEMENT LOGICAL SECTORS |
| 12~13 | START PHYSICAL SECTOR ADDRESS |
| 14~15 | NUMBER OF MANAGEMENT PHYSICAL SECTORS |
| 16~19 | DEFECT LIST 1 DEFECT START ADDRESS NUMBER OF CONTINUOUS DEFECT SECTORS |
| 20~23 | DEFECT LIST 2 DEFECT START ADDRESS NUMBER OF CONTINUOUS DEFECT SECTORS |
| 24~55 | ⋮ |
| 56~59 | DEFECT LIST 11 DEFECT START ADDRESS NUMBER OF CONTINUOUS DEFECT SECTORS |

FIG. 4
PRIOR ART

| |
|---|
| HEADER "DIRU" |
| SYSTEM DIRECTORY NUMBER = 1 |
| USER DIRECTORY NUMBER = 1 |
| START LOGICAL SECTOR ADDRESS = 1 |
| NUMBER OF MANAGEMENT LOGICAL SECTORS = 6 |
| START PHYSICAL SECTOR ADDRESS = 1 |
| NUMBER OF MANAGEMENT PHYSICAL SECTORS = 8 |
| DEFECT LIST 1<br>DEFECT START ADDRESS = 3<br>NUMBER OF CONTINUOUS DEFECT SECTORS = 2 |
| DEFECT LIST 2<br>DEFECT START ADDRESS = 0<br>NUMBER OF CONTINUOUS DEFECT SECTORS = 0 |
| DEFECT LIST 3<br>DEFECT START ADDRESS = 0<br>NUMBER OF CONTINUOUS DEFECT SECTORS = 0 |
| USER DIRECTORY DATA |

FIG. 7A
PRIOR ART

| HEADER "DIRU" |
|---|
| SYSTEM DIRECTORY NUMBER = 2 |
| USER DIRECTORY NUMBER = 2 |
| START LOGICAL SECTOR ADDRESS = 7 |
| NUMBER OF MANAGEMENT LOGICAL SECTORS = 3 |
| START PHYSICAL SECTOR ADDRESS = 9 |
| NUMBER OF MANAGEMENT PHYSICAL SECTORS = 7 |
| DEFECT LIST 1<br>DEFECT START ADDRESS = 9<br>NUMBER OF CONTINUOUS DEFECT SECTORS = 1 |
| DEFECT LIST 2<br>DEFECT START ADDRESS = 11<br>NUMBER OF CONTINUOUS DEFECT SECTORS = 2 |
| DEFECT LIST 3<br>DEFECT START ADDRESS = 14<br>NUMBER OF CONTINUOUS DEFECT SECTORS = 1 |
| USER DIRECTORY DATA |

FIG. 7B
PRIOR ART

| HEADER "DIRS" |
|---|
| SYSTEM DIRECTORY NUMBER = 3 |
| RESERVATION (0) |
| START LOGICAL SECTOR ADDRESS = 10 |
| NUMBER OF MANAGEMENT LOGICAL SECTORS = 1 |
| START PHYSICAL SECTOR ADDRESS = 16 |
| NUMBER OF MANAGEMENT PHYSICAL SECTORS = 3 |
| DEFECT LIST 1<br>DEFECT START ADDRESS = 16<br>NUMBER OF CONTINUOUS DEFECT SECTORS = 2 |
| DEFECT LIST 2<br>DEFECT START ADDRESS = 0<br>NUMBER OF CONTINUOUS DEFECT SECTORS = 0 |
| ⋮ |
| DEFECT LIST 11<br>DEFECT START ADDRESS = 0<br>NUMBER OF CONTINUOUS DEFECT SECTORS = 0 |

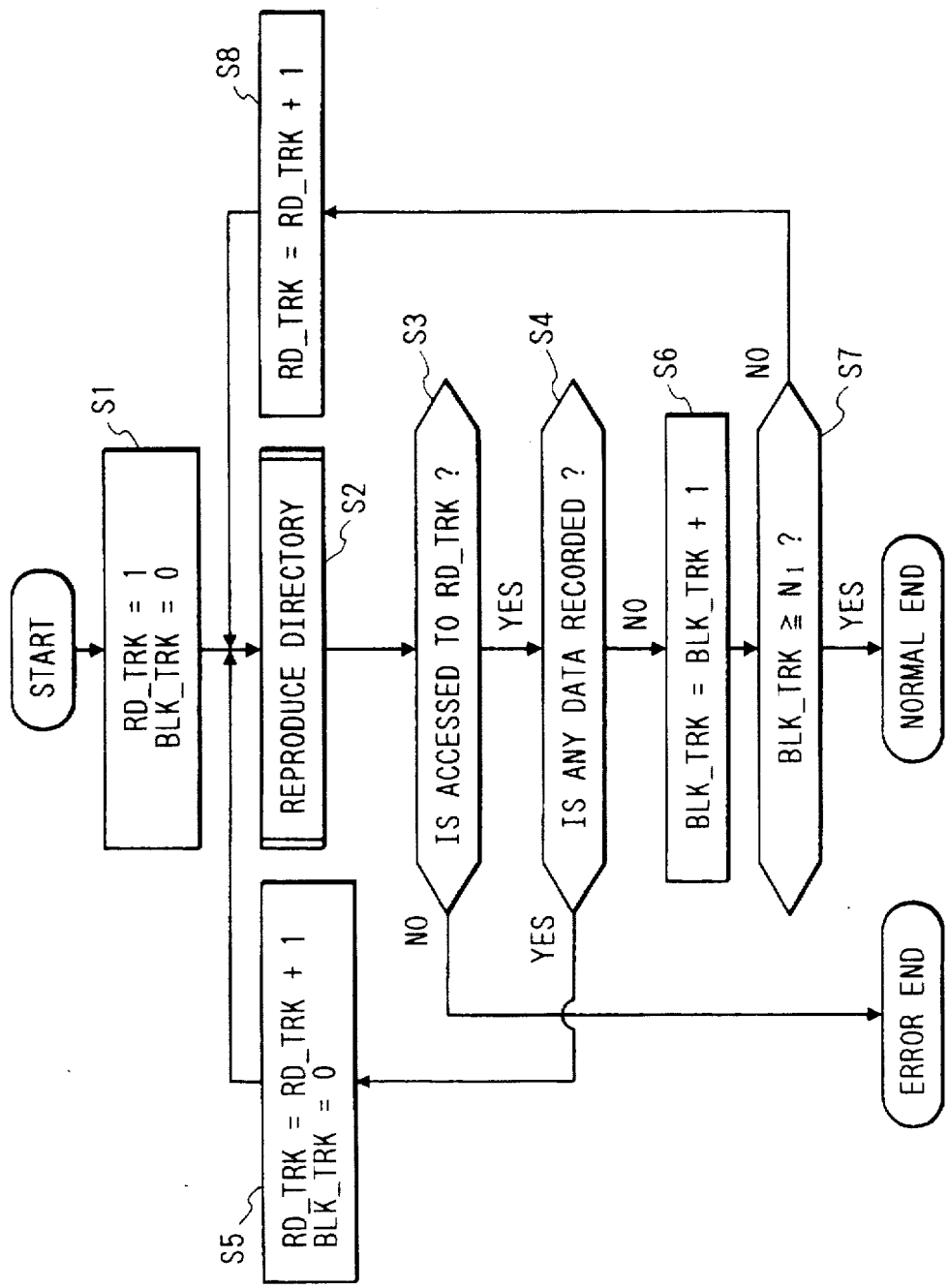

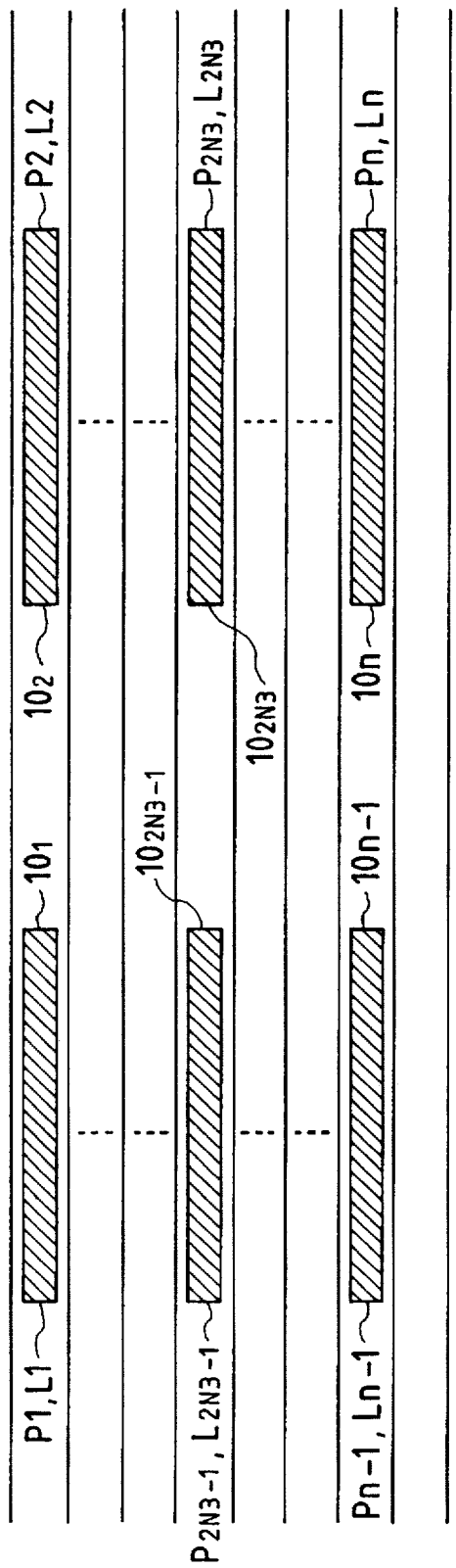

FIG. 13

| |
|---|
| HEADER "DIRS" |
| SYSTEM DIRECTORY NUMBER = 1 |
| RESERVATION (0) |
| START LOGICAL SECTOR ADDRESS = 0 |
| NUMBER OF MANAGEMENT LOGICAL SECTORS = 0 |
| START PHYSICAL SECTOR ADDRESS = 1 |
| NUMBER OF MANAGEMENT PHYSICAL SECTORS = $2N_3$ |
| DEFECT LIST 1<br>  DEFECT START ADDRESS = 1<br>  NUMBER OF CONTINUOUS DEFECT SECTORS = $2N_3$ |
| DEFECT LIST 2<br>  DEFECT START ADDRESS = 0<br>  NUMBER OF CONTINUOUS DEFECT SECTORS = 0 |
| ⋮ |
| DEFECT LIST 11<br>  DEFECT START ADDRESS = 0<br>  NUMBER OF CONTINUOUS DEFECT SECTORS = 0 |

FIG. 14

| |
|---|
| HEADER "DIRU" |
| SYSTEM DIRECTORY NUMBER = 2 |
| USER DIRECTORY NUMBER = 1 |
| START LOGICAL SECTOR ADDRESS = 1 |
| NUMBER OF MANAGEMENT LOGICAL SECTORS = 4 |
| START PHYSICAL SECTOR ADDRESS = $2N_3+1$ |
| NUMBER OF MANAGEMENT PHYSICAL SECTORS = $n-2N_3+4$ |
| DEFECT LIST 1<br>DEFECT START ADDRESS = $2N_3+1$<br>NUMBER OF CONTINUOUS DEFECT SECTORS = $n-2N_3$ |
| DEFECT LIST 2<br>DEFECT START ADDRESS = 0<br>NUMBER OF CONTINUOUS DEFECT SECTORS = 0 |
| DEFECT LIST 3<br>DEFECT START ADDRESS = 0<br>NUMBER OF CONTINUOUS DEFECT SECTORS = 0 |
| USER DIRECTORY DATA |

INFORMATION RECORDING METHOD

This application is a continuation of application Ser. No. 08/334,332, filed Nov. 2, 1994, which is now abandoned.

BACKGROUND OF THE INVENTION

1. Field of the Invention

The present invention relates to an information recording method for recording information to an information recording medium such as an optical card or the like.

2. Related Background Art

Hitherto, as a form of a recording medium to which information is optically recorded or from which recorded information is optically read out, various kinds of forms such as disk shape, card shape, tape shape, and the like are known. Among them, the card-shaped recording medium (hereinbelow, referred to as an optical card) has a small size and a light weight and is convenient to carry and, further, has a large recording capacity. Therefore, a large demand is expected as a write-once type recording medium in the future.

In case of recording or reproducing information to/from such an optical card, generally, information is managed for every file by using management information (hereinafter, referred to as a directory) for managing file data. The directory comprises information such as file name, file length, track number of head data, and the like which are necessary for the file management. The directory is written into a part of the optical card.

FIG. 1 is a plan view showing the recording surface of the optical card. A number of tracking tracks $3_1$ to $3_{n+1}$ are arranged in parallel in an information recording area 2 of an optical card 1. Information tracks $4_1$ to $4_n$ to record information are provided among the tracking tracks. Physical track numbers $5_1$ to $5_n$ to discriminate the information tracks have been recorded in both edge portions of the information tracks.

The information recording area 2 is divided into a data section 10 to record file data and a directory section 20 to record a directory. In the data section 10, one information track is divided into two sectors. In the directory section 20, one information track is divided into four sectors. In case of recording the file data, it is sequentially recorded in accordance with the order such that data $10_1, 10_2, 10_3, \ldots$ from the sector on the left side of the information track $4_n$ on the upper side on the diagram. On the other hand, in case of recording the directory, it is sequentially recorded in accordance with the order such that directories $20_1, 20_2, 20_3, \ldots$ from the sector on the left side of the information track $4_1$ on the lower side on the diagram.

In this instance, it is assumed that data of a file C having a capacity of six sectors is recorded to the optical card in FIG. 1. FIG. 2 is a diagram showing a state in which the data has been recorded in this instance. In FIG. 2, a sector shown by a hatched portion is a sector in which data could normally be recorded and a sector painted in black is a sector in which a recording error occurred. Both of two sectors of the second information track cause the recording errors. The data of six sectors of the file C is recorded so as to avoid those errors. An address indicative of a sector position is called as a physical address for convenience of explanation and physical addresses $P_1$ to $P_8$ are sequentially allocated to all sectors in accordance with the order from the head sector. On the other hand, only the sector in which data could normally be recorded is called a logical address for convenience of explanation. In FIG. 2, except two sectors indicating the recording errors, logical sectors $L_1$ to $L_6$ are sequentially allocated to the other sectors in accordance with the order from the head sector. In the optical card in FIG. 1, the physical address and the logical address are allocated to each sector by a similar method.

In a recording medium such as an optical card, there is a case where there is a sector which cannot be used because a defect occurs during the manufacturing or a case where even after completion of the manufacturing, dust is adhered to the card during the use of the optical card or the card is scratched, so that a recording error occurs. Therefore, in the case where a sector in which data cannot be recorded (hereinafter, referred to as a defect sector) occurs, what is called an alternating process such that the same data is again recorded to the next sector of the defect sector to thereby avoid the recording error is executed. In the example of FIG. 2, since the two sectors of the second information track are the defect sectors, the alternating process is executed to the next sector.

According to such an alternating process, however, in the case where a number of defect sectors occur in one file, there is a case where all of the defect information cannot be recorded in one directory. The assignee of the present invention has already filed the information recording method which can solve such a problem in Japanese Patent Application No. 4-83055 (U.S. patent application Ser. No. 942,403). Such an information recording method will now be described hereinbelow.

First, in the information recording method, two kinds of directories such as user directory and system directory are used as directories. The user directory is a directory which is recorded by the user and which can record, for example, up to three defect lists of a file which is managed by the user directory as will be described in detail hereinlater. When there are four defect lists or more, a system directory is formed and the defect lists which could not be recorded to the user directory are recorded to the system directory. As mentioned above, the system directory is a directory which is formed by the system when the number of defect lists increases to a value larger than a predetermined number.

FIG. 3A is a diagram showing a format of the user directory and FIG. 3B is a diagram showing a format of the system directory. A header in the diagram is used for discriminating whether the directory is the user directory or the system directory. According to the ASCII code, when the directory is the user directory, "DIRU" is written and, when it is the system directory, "DIRS" is written. A system directory number is a serial number which is common to both of the system directory and the user directory. A user directory number is a serial number which is applied to only the user directory. A start logical sector address and the number of management logical sectors indicate the head logical address of a logical area which is managed by the directory and the size of the area. A start physical sector address and the number of management physical sectors indicate the head physical address of a physical area which is managed by the directory and the size of the area. The above start logical address, number of management logical sectors, start physical sector address, and number of management physical sectors are called sector management information as a general denomination.

The defect list is a list for recording a defect start address as a head physical address of a defect sector and information regarding a defect shown by the number of continuous defect sectors. Such a recording method is very effective because information about defects can be recorded by a small number of bytes for a burst defect. As mentioned above, the three defect lists (1 to 3) can be recorded in the user directory. The defect lists (1 to 11) can be recorded in the system directory. User directory data is recorded in only the user directory and information such as file name, file size, head logical sector address, and the like is recorded. The numerical value allocated to each directory in FIGS. 3A and 3B indicate the number of bytes of each item.

FIG. 4 is a diagram showing the contents of the user directory which is formed when the file C shown in FIG. 2 is recorded to the optical card. Since the directory is the user directory, first, "DIRU" is written to the header by the ASCII code. "1" is written to each of the user directory number and the system directory number because the directory is the first directory. As shown in FIG. 2, since the file C is first written to the optical card and the head sector is the normal sector, both the start logical sector address and the start physical sector address are equal to "1". Further, since the file C has been recorded over six sectors, the number of management logical sectors is equal to 6. Since eight sectors are needed to record all data of the file C, the number of management physical sectors is equal to 8.

As shown in FIG. 2, in case of recording the file C, since the recording errors continuously occur in the physical sector addresses $P_3$ and $P_4$, the defect list 1 in which the defect start address is equal to 3 and the number of continuous defect sectors is equal to 2 is recorded. Since the file C does not have any other defect sector, the defect lists 2 and 3 are not formed. As user directory data, information such as file name of the file C, head logical sector address, file size, and the like are recorded.

In this instance, it is now assumed that the optical card 1 in which the data of the file C has been recorded in the data section 10 as shown in FIG. 2 and the directories of the file C as shown in FIG. 4 have been recorded in the directory section 20 is set to an information recording/reproducing apparatus (not shown) and data of a file D having a capacity of four sectors is newly additionally written once to the optical card. The writing operation in this instance will now be described with reference to FIG. 5. In FIG. 5, in the case where file data is additionally written once to the optical card, the file data is written once from the next sector of the final recording data (hereinbelow, referred to as an EOS) and directories of the file data are written once from the next sector of the final recording directory (hereinafter, referred to as an EOD). Therefore, in the case where the optical card is set to the apparatus and the file data is additionally written once, the EOD is detected while reading out all of the directories recorded in the optical card (S1). Subsequently, a check is made to see if the EOD could normally be detected or not (S2). When it can normally be detected, the position of the EOS is calculated from the sector management information recorded in the EOD (S3). The position of the EOS can be obtained by adding the number of management physical sectors to the start physical sector address and by subtracting "1" from the resultant added value. In the case where no directory is recorded, the EOS is set to 0. On the other hand, in the case where an error occurs in the EOD detection, the processing routine is finished as an error without recording the file data.

In the case where the user directory of the file C in FIG. 4 is not recorded by some reasons, the EOS obtained by the calculation is equal to 0 as mentioned above and there is a case where it does not coincide with the actual EOS on the optical card. Therefore, in order to discriminate whether the EOS obtained from the sector management information is correct or not, a process for detecting the EOS is executed (S4). After that, a check is made to see if the actual EOS could be detected or not (S5). In this instance, if the EOS cannot be detected, the recording position is obscure, so that the processing routine is finished as an error. When the EOS can be detected, the file data is additionally written once from the next sector of the EOS one sector by one (S6). A check is made to see if the file data could normally be recorded or not by performing a verification just after the recording (S7). When the file data cannot normally be recorded, the processing routine is finished as an error. When all of the file data can normally be recorded, the directory of the file D is written once in the next sector of the EOD (S8). A check is also made to see if the directory could normally be recorded or not by performing a verification just after the recording (S9). When the directory cannot normally be recorded, the processing routine is finished as an error. When the directory can normally be recorded, the writing process of the file D is finished. A practical detecting process of the EOS in step S4 will be described in detail hereinafter.

FIG. 6 is a diagram showing a recording state of the sectors of the optical card when the file D has been written once after the file C as mentioned above. Each of the sectors shown by hatched portions in the diagram is a sector in which data could normally be recorded. Each of the black painted sectors is a defect sector in which a recording error occurs. The file D is the file having the capacity of four sectors as mentioned above. In this case, however, the file data is recorded in physical addresses $P_9$ to $P_{18}$, so that ten sectors are needed as a whole. Therefore, the remaining six sectors among the ten sectors are defect sectors. Specifically speaking, the physical addresses $P_9$, $P_{11}$, $P_{12}$, $P_{14}$, $P_{16}$, and $P_{17}$ are the defect sectors.

Explanation will now be made with respect to how the user directory and the system directory are recorded when the file D is additionally written once to the optical card as shown in FIG. 6. FIG. 7A shows the user directory and FIG. 7B shows the system directory. With respect to the user directory, as shown in FIG. 7A, "DIRU" is written into the header. Since it is the second directory, "2" is recorded to each of the system directory number and the user directory number. Subsequently, since the logical address of the file D starts from a logical address $L_7$ as shown in FIG. 6, the start logical address is equal to seven. Although four sectors are needed to record all of the file D, up to three defect lists are formed in the directory. Since the number of logical sectors which can be managed by the three defect lists is equal to three, the number of management logical sectors is equal to three. In a manner similar to the above, since the data of the file D starts from the physical address $P_9$, the start physical sector address is equal to nine. Although ten sectors are needed to record the data of the file D, since the number of physical sectors which can be managed by the three defect lists is equal to seven, the number of management physical sectors is equal to seven.

Further, in case of recording the data of the file D, since the recording error occurs at first in the physical sector $P_9$ as shown in FIG. 6, the defect list in which the defect start address is equal to 9 and the number of continuous defect sectors is equal to 1 is recorded. In a manner similar to the above, since the recording errors continuously occur in the physical addresses $P_{11}$ and $P_{12}$, the defect list 2 in which the defect start address is equal to 11 and the number of continuous defect sectors is equal to 2 is recorded. Since the physical address $P_{14}$ is also a defect sector, the defect list 3 in which the defect start address is equal to 14 and the number of continuous defect sectors is equal to 1 is recorded. In the user directory, since up to three defect lists can be formed as mentioned above, defect lists subsequent to them are recorded to the system directory. As user directory data, information such as file name, file size, and the like of the file D are recorded.

The system directory will now be described. As a system directory, as shown in FIG. 7B, "DIRS" is first written as a header. Since it is the third directory, "3" is written to the system directory number. The logical addresses $L_7$ to $L_9$ are managed by the user directory. Since the first logical address which is managed by the directory is set to $L_{10}$, the start logical sector address is equal to 10 and the number of management logical sectors is equal to 1. In a manner similar to the above, since the first physical address which is managed by the directory is $P_{16}$, the start physical sector address is equal to 16 and the number of management physical sectors is equal to 3. Although the defect lists which cannot be recorded to the user directory as mentioned above are recorded as defect lists, since defects continuously occur in the physical addresses $P_{16}$ and $P_{17}$ as shown in FIG. 6, defect information such that the defect start address is set to 16 and the number of continuous defect sectors is equal to 2 is recorded as a defect list 1. Since any other defect sector does not occur in the file D, the defect list 2 and subsequent lists are not formed.

A method of detecting the EOD and EOS while reading all directories explained in FIG. 5 will now be described in detail. First, a method of detecting the EOD while reading out all directories will now be explained with reference to FIG. 8. In FIG. 8, "1" as a head track of the directory section is set to a variable (RD_TRK) indicative of the track to be first reproduced and "0" is set to a variable (BLK_TRK) for counting the number of continuous tracks which are not recorded (S1). The track indicated by (RD_TRK) is subsequently accessed, thereby reproducing all directories on such a track (S2). Since the numerical value of (RD_TRK) is equal to 1 in this instance, the directory of the head track of the directory section is reproduced. After that, a check is made to see whether the track indicated by (RD_TRK) could normally be accessed or not (S3). If NO, the processing routine is finished as an error. When the track can be normally accessed, a check is made to see if there is a directory recorded in the accessed track or not (S4). In this instance, in the case where the directory has been recorded, "1" is added to (RD_TRK) and (BLK_TRK) is held to 0 (S5). Returning to S2, the track indicated by (RD_TRK) is accessed, thereby reproducing the directory. Since the numerical value of (RD_TRK) is now equal to 2, the directory of the next track of the head track is reproduced. As mentioned above, the processes in steps S2 to S5 are repetitively executed and the directories are sequentially reproduced in accordance with the order from the head track.

While directories are being reproduced as mentioned above, it is judged that there is a track in which no data is recorded. In this instance, the track just before the track in which no data is recorded becomes a temporary EOD. However, in the case where dust or the like is adhered to the card, there is a case where several tracks are skipped and data is recorded. Therefore, the EOD is confirmed by confirming that a predetermined number of unrecorded tracks continue. Specifically speaking, "1" is first added to (BLK_TRK) (S6). The resultant added value and a preset $N_1$ are compared (S7). $N_1$ denotes a numerical value for specifying the number of unrecorded tracks and is ordinarily set to a few tracks.

As a result of the comparison between (BLK_TRK) and $N_1$, when the value of (BLK_TRK) is smaller than the value of $N_1$, "1" is added to (RD_TRK) (S8). The processing routine is returned to step S2 and the directory of the track shown by (RD_TRK) is reproduced. Since the value of (BLK_TRK) is equal to 1 in this instance, the discrimination result is NO in step S7, so that the next track of the first unrecorded track shown by (RD_TRK) is reproduced. When the unrecorded track is found out as mentioned above, the processes in steps S2 to S8 are repetitively executed and data is sequentially reproduced in accordance with the order from the next track of the first unrecorded track. When the value of (BLK_TRK) is equal to the value of $N_1$ in step S7, since there are continuous $N_1$ unrecorded tracks, the track just before the unrecorded track which was detected in step S4 is decided as an EOD. The reproduction of all directories on the optical card and the detection of the EOD are finished as mentioned above.

A method of detecting the EOS on the optical card will now be described with reference to FIG. 9. In FIG. 9, the track of the next sector of the EOS calculated from the sector management information of the EOD is first set to the variable (RD_TRK) indicative of the track to be reproduced. The position of the EOS can be obtained by subtracting "1" from the value obtained by adding the management physical sector to the start physical sector address as mentioned above. "0" is set to each of the variable (BLK_TRK) for counting the number of continuous unrecorded tracks and a variable (RTY) for counting the number of retry times of the EOS detecting operation (S1). Subsequently, the track shown by (RD_TRK) is accessed and the data on the track is reproduced (S2). After that, a check is made to see if the track shown by (RD_TRK) could normally be accessed or not (S3).

When the track cannot be normally accessed, the processing routine is finished as an error. When the track can be normally accessed, a check is made to see whether no data is recorded in the reproduced track or not (S4). In this case, since the accessed track is the track obtained by the calculation on the basis of the directory in step S1, when the calculation is correct, no data ought to be recorded in the track. Therefore, if the data was recorded in the accessed track, the previous calculation is wrong. Therefore a process for retrieving the EOS is executed by repeating the retry a number of times of only a predetermined number of tracks.

Specifically speaking, "0" is set to (BLK_TRK) and "1" is set to (RTY) (S5) and (RTY) and $N_3$ are compared (S6). $N_3$ is a numerical value to specify the number of retry times indicating how many tracks are retried and is usually set to tens of tracks. In case of comparing (RTY) and $N_3$, since (RTY) is equal to "1", the result of the comparison in step S6 is NO, so that "1" is subtracted from (RD_TRK) in the next step, thereby instructing the next track of the track which has already been accessed (S7). When detecting the EOD in FIG. 8 in this case, "1" is added to (RD_TRK) and the next track of the directory section is instructed. However, when detecting the EOD, "1" is subtracted from (RD_TRK) and the next track of the data section is instructed. This is because in the directory section 20 of the optical card 1 as shown in FIG. 1, $4_1$ on the lower side on the diagram indicates the head track and the directories are sequentially written upward. In the data section 10, $4_n$ on the upper side indicates the head track and data is sequentially written downward.

When the next track is instructed, data of the instructed track is again reproduced in step S2. In a manner similar to the above, if the data has been recorded, "1" is subtracted from (RD_TRK) and a process for instructing the next track of the instructed track. As mentioned above, the processes in steps S2 to S7 are repetitively executed and a process for sequentially retrieving the tracks in which no data is recorded in accordance with the order from the first accessed track is performed. In the case where the result of the comparison between (RTY) and $N_3$ in step S6 is YES and the unrecorded track cannot be detected even if the retry was repeated only the predetermined number of retry times $N_3$, the processing routine is finished as an error at that time point.

On the other, in the case where no data is recorded in the first accessed track or where data has been recorded in the first accessed track as mentioned above and the unrecorded track is detected while repeating the retry so as to detect the unrecorded track, the discrimination result in step S4 is YES and the track just before the detected unrecorded track is set to the EOS. In this case, although it is temporarily the EOS, the confirmation of the EOS is executed by confirming that a predetermined number of unrecorded tracks continue in a manner similar to that in FIG. 8. In the above confirmation, "1" is first added to (BLK_TRK) (S8) and the resultant value and the value of $N_2$ are compared (S9). As a comparison result, if (BLK_TRK) is smaller than $N_2$, "1" is subtracted from (RD_TRK) and the next track is instructed (S10). $N_2$ is a numerical value to specify the number of continuous unrecorded tracks in the data section. When only $N_2$ unrecorded tracks continue, the EOS which has precedently detected is decided as an actual EOS. The value of $N_2$ is ordinarily set to about a few tracks. Returning to step S2, the instructed next track is reproduced and a check is made to see if data has been recorded or not in a manner similar to the above. As mentioned above, the processes in steps S2 to S10 are repetitively executed. When it is confirmed that $N_2$ unrecorded tracks continue, the EOS is decided as mentioned above. The detection of the EOS is finished as mentioned above. When a file is recorded to the optical card, the data and directories are additionally written once from the next positions of the EOS and EOD.

However, in the information recording method as mentioned above, in the case where data has been recorded in the EOS obtained by the calculation as described in FIG. 9, the track at the final recording position is retrieved by repeating the retry only $N_3$ times. When, however, the EOS cannot be detected even if the retry was performed the predetermined number of times, the processing routine is finished as an error. For instance, in the case where the optical card is erroneously delivered out of the apparatus during the recording of the data having a relatively large file size to the unrecorded optical card or before the recording of the directories after the data was recorded, since no directory is recorded, even if the retry is repeated in accordance with the order from the head track of the data section of the optical card and the retry is performed a predetermined number of times, the EOS cannot be detected. Therefore, in such a case, since the processing routine is finished as an error after that the retry process was repeated the predetermined number of times, there is a problem such that a file cannot be additionally written once even if the optical card was set to the apparatus many times.

SUMMARY OF THE INVENTION

The present invention is made in consideration of the above conventional problem. It is an object of the invention to provide an information recording method which can always detect a final recording position of a data section.

The object of the invention is accomplished by an information recording method whereby a recording start position of a data section in which file data of a recording medium has been recorded is calculated on the basis of a directory for managing a file of the information recording medium recorded in a directory section and, when the data has been recorded in the calculated recording start position, a retry operation to judge whether data has been recorded in the next recording position or not is repeated a predetermined number of times, thereby retrieving the final recording position of the data section, wherein in the case where the final recording position of the data section could not be detected by repeating the retry operation the predetermined number of times, information indicative of the recording position at which the retry operation was finally executed is recorded to the directory section.

BRIEF DESCRIPTION OF THE DRAWINGS

FIGS. 3A and 3B are diagrams showing formats of a user directory and a system directory which are used in a conventional information recording method;

FIG. 4 is a diagram showing the contents of the user directory which is formed when the file C in FIG. 2 is recorded to the optical card;

FIGS. 7A and 7B are diagrams showing the contents of the user directory and the system directory which are formed when the files C and D in FIG. 6 are recorded;

FIG. 8 is a flowchart showing the details of a process for detecting an EOD while reading all directories in the flowchart of FIG. 5;

FIG. 12 is a diagram showing a state in which a file A has been recorded in an optical card;

FIG. 13 is a diagram showing the contents of a system directory which is recorded when a final recording position of the file A could not be detected by the information recording method in FIG. 10; and FIG. 14 is a diagram showing the contents of the user directory which is recorded by the information recording method in FIG. 10 after that the file B was additionally written once.

DETAILED DESCRIPTION OF THE PREFERRED EMBODIMENTS

Figure 1:
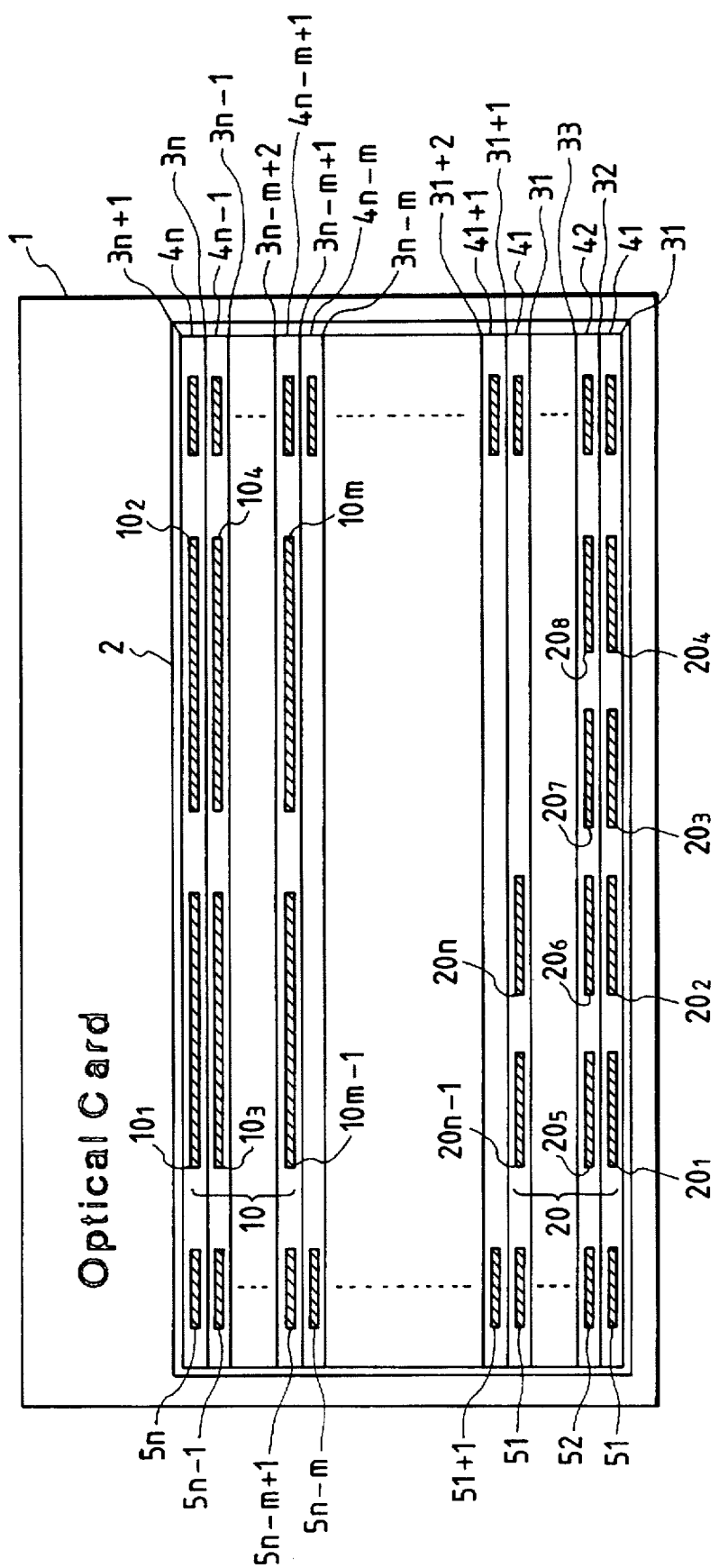
FIG. 1 is a plan view showing a recording surface of an optical card.
Figure 2:
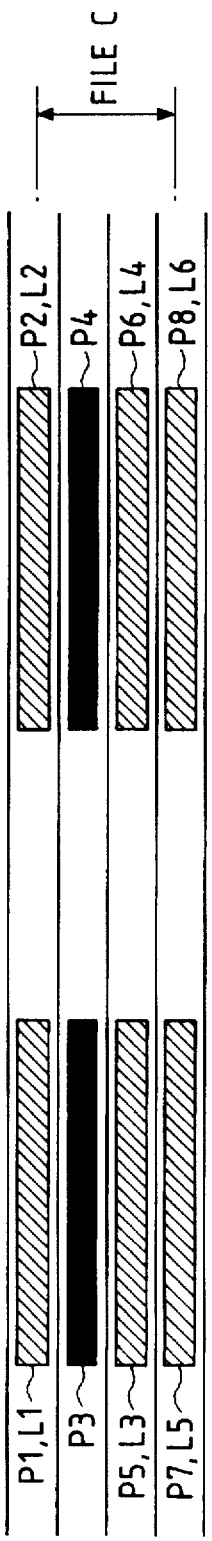
FIG. 2 is a diagram showing a state in which a file C has been recorded in the optical card.
Figure 6:
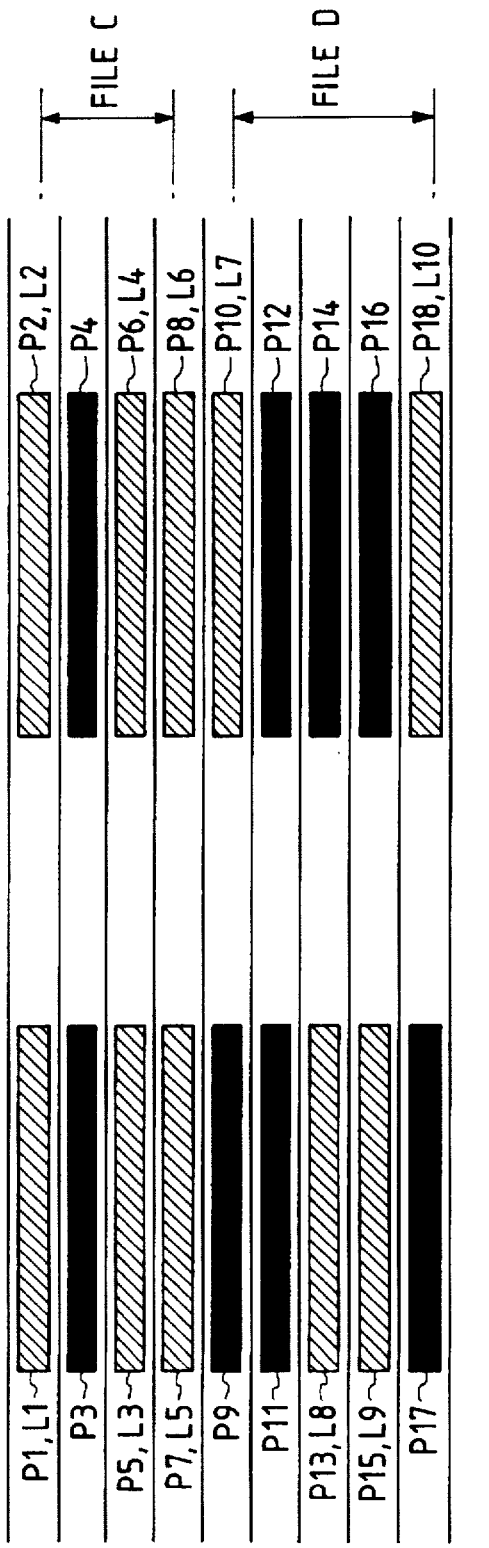
FIG. 6 is a diagram showing a state in which a file D is additionally written once after the file C in FIG. 2.
Figure 5:
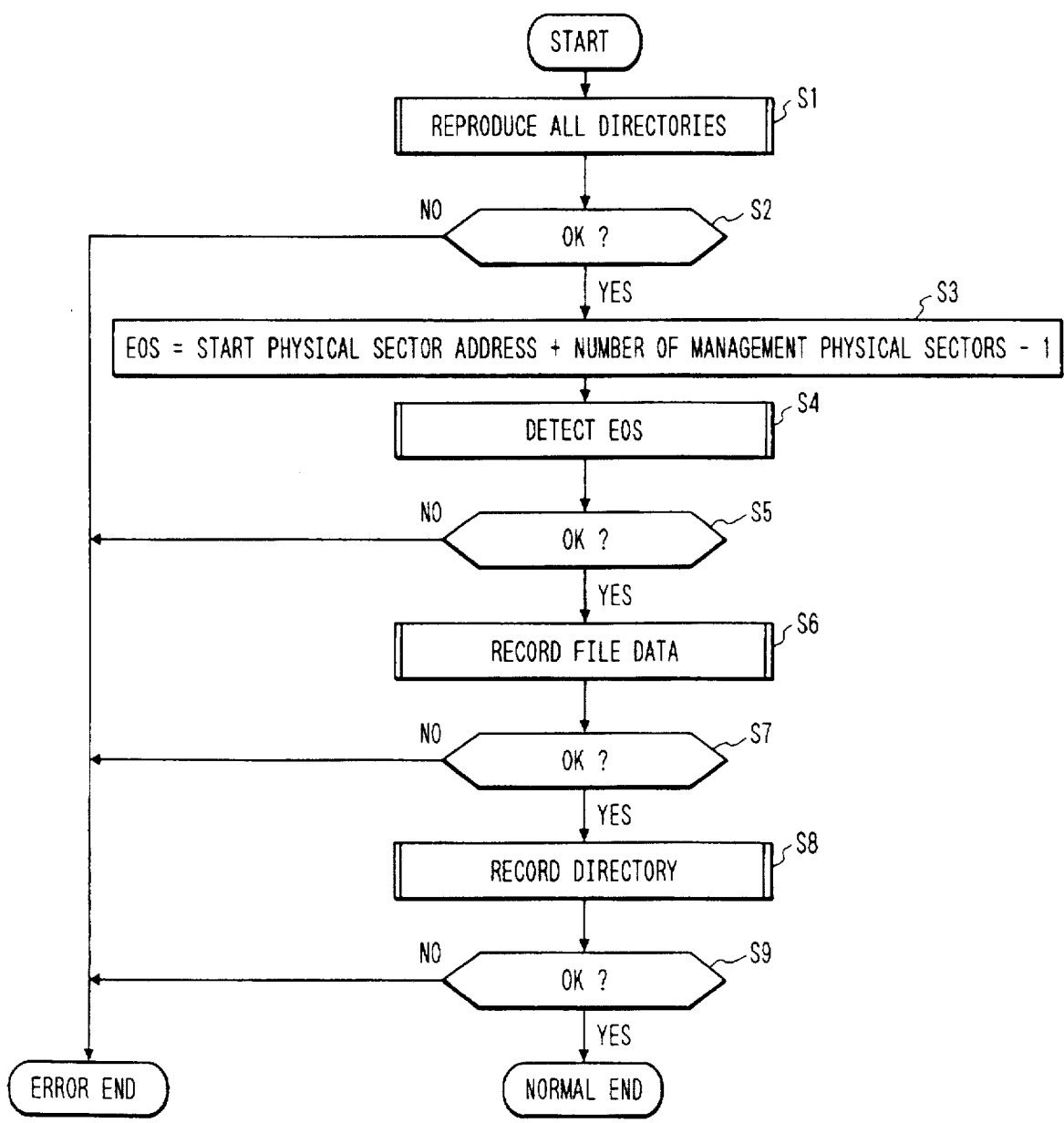
FIG. 5 is a flowchart showing a method of recording information by using the directory in FIGS. 3A and 3B.
Figure 11:
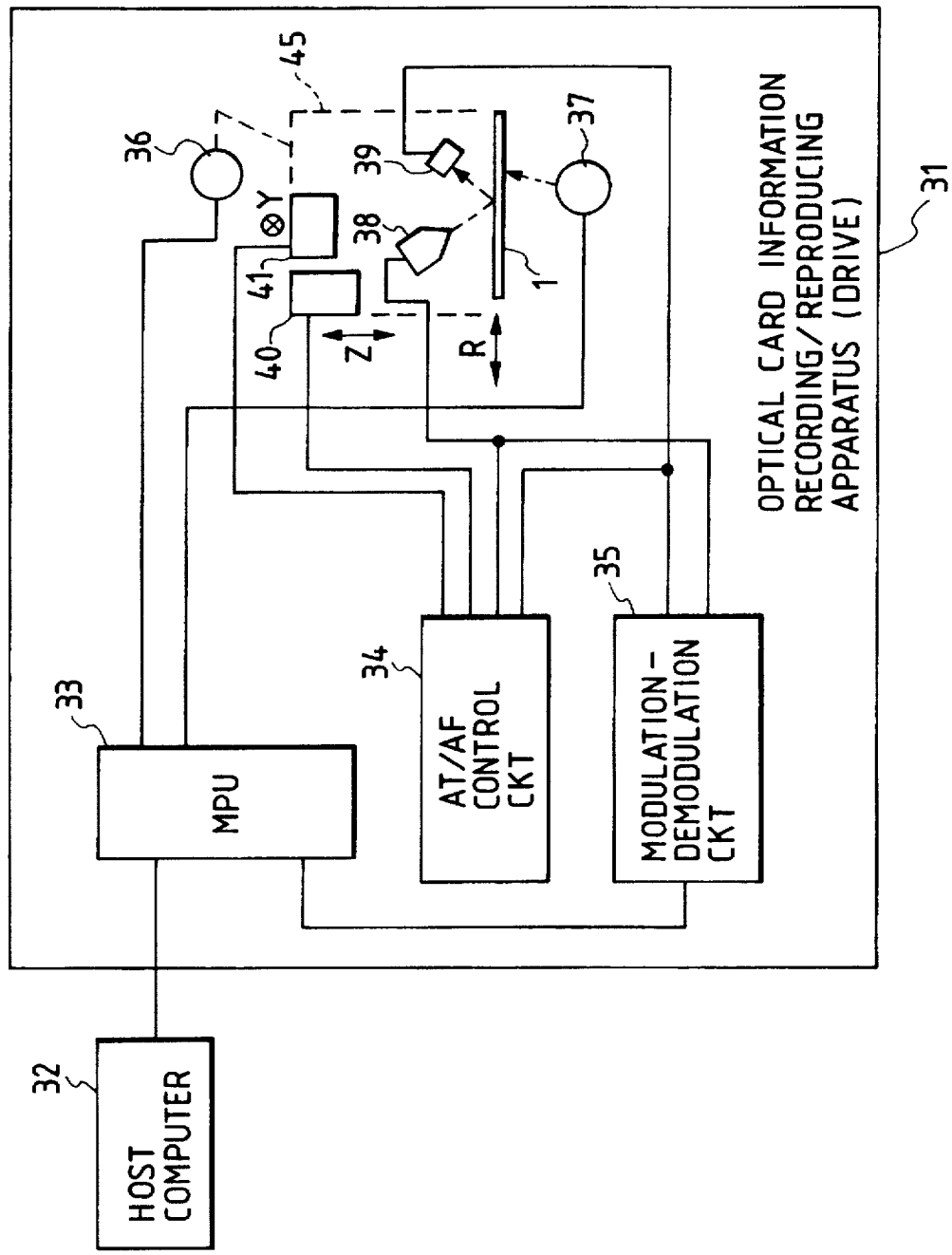
FIG. 11 is a constructional diagram showing an example of an optical card information recording and reproducing apparatus according to the information recording method of the invention.

An embodiment of the present invention will now be described in detail hereinbelow with reference to the drawings. In the embodiment, it is assumed that an optical card in which a recording area is divided into a data section and a directory section as shown in FIG. 1 is used as an information recording medium. As for the directory, it is assumed that as described in FIGS. 3A and 3B, a file is managed by using a user directory and a system directory. FIG. 11 is a block diagram showing a constructional example of an optical card information recording/ reproducing apparatus which is used in an information recording method of the invention. First, a construction of the optical card information recording/reproducing apparatus will now be described with reference to FIG. 11. In FIG. 11, reference numeral 31 denotes an optical card information recording/reproducing apparatus (hereinafter, referred to as a drive) for recording and reproducing information by using the write-once type optical card 1 as an information recording medium. The drive 31 is connected to a host computer 32 as an upper control apparatus and records or reproduces information on the basis of an instruction of the host computer 32. Reference numeral 37 denotes a motor for loading the optical card 1 into the drive 31 by a conveying mechanism (not shown) and reciprocating the card in an R direction at a predetermined position and, further, delivering the card to the outside of the apparatus. Reference numeral 38 indicates a light beam irradiation optical system including a light source. A light beam spot is scanned on the optical card 1 in the information recording mode and the information reproducing mode. Reference numeral 39 denotes a photodetector for receiving the reflected light of the light beam spot on the optical card 1.

Reference numeral 40 denotes an AF actuator for driving a part of the light beam irradiation optical system 38 and moving a focusing position of the light beam spot in a Z direction, namely, in the direction perpendicular to the optical card surface, thereby performing an auto-focusing (AF). Reference numeral 41 denotes an AT actuator for driving a part of the light beam irradiation optical system 38 and moving the light beam spot on the optical card surface in a Y direction, namely, in the direction perpendicular to both of the R and Z directions, thereby performing an auto-tracking (AT). An optical head 45 is integrally constructed by the light beam irradiation optical system 38, photodetector 39, AF actuator 40, AT actuator 41, and the like. Reference numeral 36 denotes a driving motor to move the optical head 45 in the Y direction, thereby accessing the light beam spot to a desired track on the optical card 1.

Reference numeral 33 denotes an MPU having therein a ROM and a RAM. The MPU 33 controls the card feed motor 37 and the head feed motor 36 and performs communication, control, and the like of data with the host computer 32 under the control of the host computer 32. An AT/AF control circuit 34 receives a signal of the photodetector 39 and drives the AF actuator 40 and the AT actuator 41, thereby performing the focusing and tracking controls. The output of the photodetector 39 is also supplied to a modulation-demodulation circuit 35, so that the read-out information is demodulated and a demodulation signal is sent to the MPU 33. The modulation-demodulation circuit 35 modulates an information signal which is supplied from the MPU 33 and executes the information recording by driving the light beam irradiation optical system 38 in accordance with the modulation signal. The circuit 35 also demodulates the data on the basis of the signal of the photodetector 39 in the reproducing mode. The host computer 32 transmits and receives data to/from the drive 31. The drive 31 reproduces information from every sector from the optical card 1 on the basis of the instruction of the host computer 32. The optical card 1 generally has a high error ratio because of the property of the medium. In case of requiring information of a high reliability, error correcting means is needed.

FIG. 12 is a diagram showing a state in which a file A having a data capacity of n sectors has been recorded in an unrecorded optical card by the drive 31 in FIG. 11. It is assumed that a value of n is equal to or larger than $2N_3$ and is smaller than $4N_3$ and $N_3$ denotes a numerical value to specify the number of retry times when retrieving the EOS as described in FIG. 9. It is also assumed that the optical card has erroneously been ejected out of the drive 31 after the data of the file A was recorded, so that the directory to manage the file A is not recorded. Further, it is assumed that in case of recording the file A, no recording error occurs and data $10_1$, $10_2$, ... and $10_n$ is continuously recorded from the head sector. Therefore, since no recording error occurs, the physical address and the logical address coincide.

Figure 10:
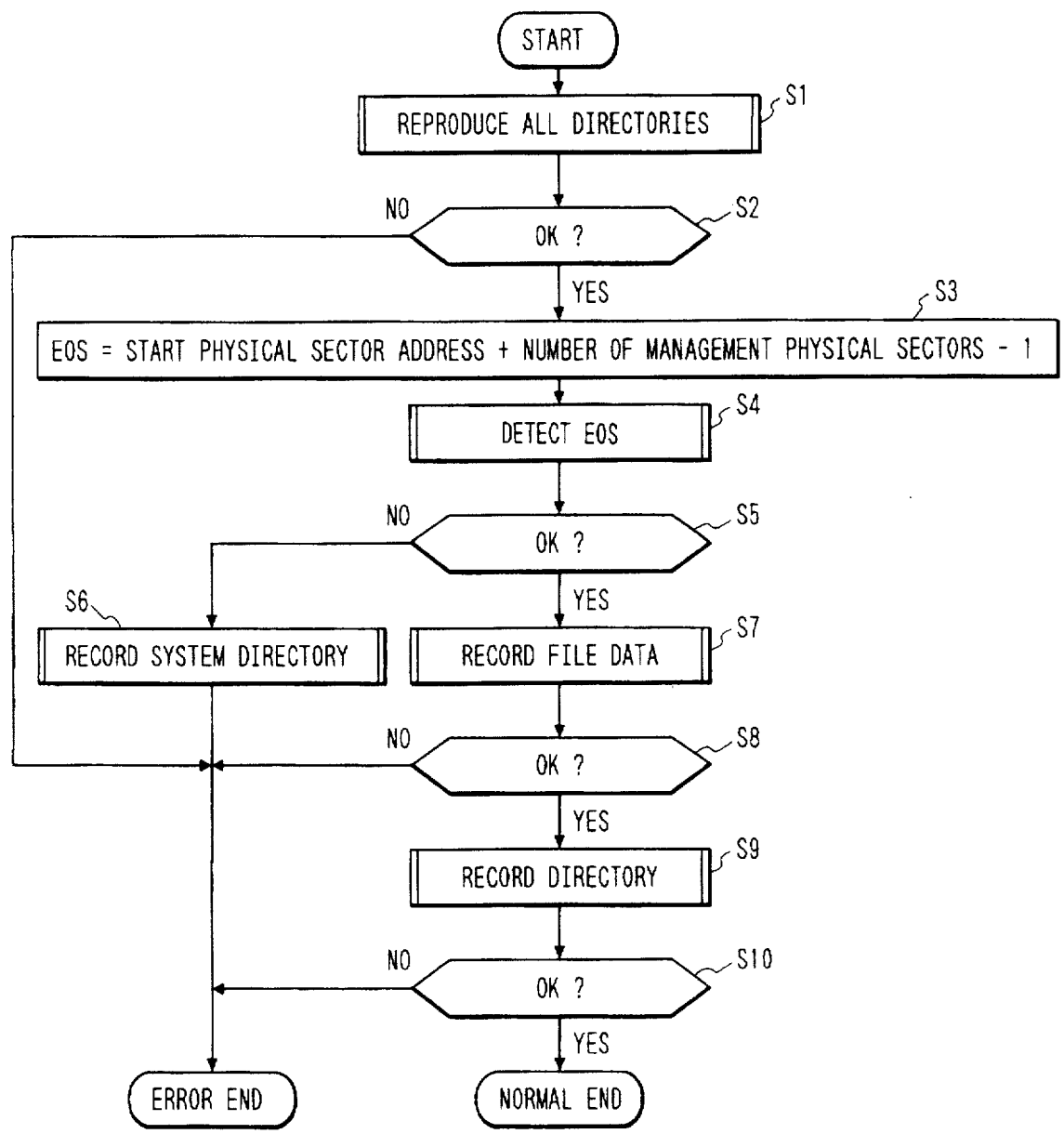
FIG. 10 is a flowchart showing an embodiment of an information recording method of the invention.

An embodiment of the information recording method of the invention will now be described with reference to the flowchart of FIG. 10. As shown in FIG. 12, it is now assumed that the optical card in which only the data of the file A has been recorded is set to the drive 31 in FIG. 11 and data of a file B having a data capacity of four sectors is additionally written once after the file A. In FIG. 10, a process for detecting the EOD while reading out all directories recorded in the optical card is executed in the drive 31 (S1). The reproduction of all directories and the detection of the EOD are performed in accordance with the flowchart of FIG. 8.

Since the detecting process of the EOD has already been described in FIG. 8, the detailed explanation is omitted here. The final directory is detected by sequentially reproducing the directories from the head sector of the directory section of the optical card. Subsequently, a check is made to see whether the EOD could be normally detected or not (S2). However, since the above step is the discrimination about whether the directory could be normally reproduced without causing any error or not, even if no directory is recorded, the discrimination result is YES. If the directory cannot be normally detected, the processing routine is finished as an error. When the directory can be normally detected, the EOS is calculated from the sector management information recorded in the EOD (S3). Although the EOS is obtained by subtracting "1" from the value which is derived by adding the start physical address and the number of management physical sectors, in the case where no directory is recorded, the EOS is equal to "0" as mentioned above and does not coincide with the actual EOS.

Figure 9:
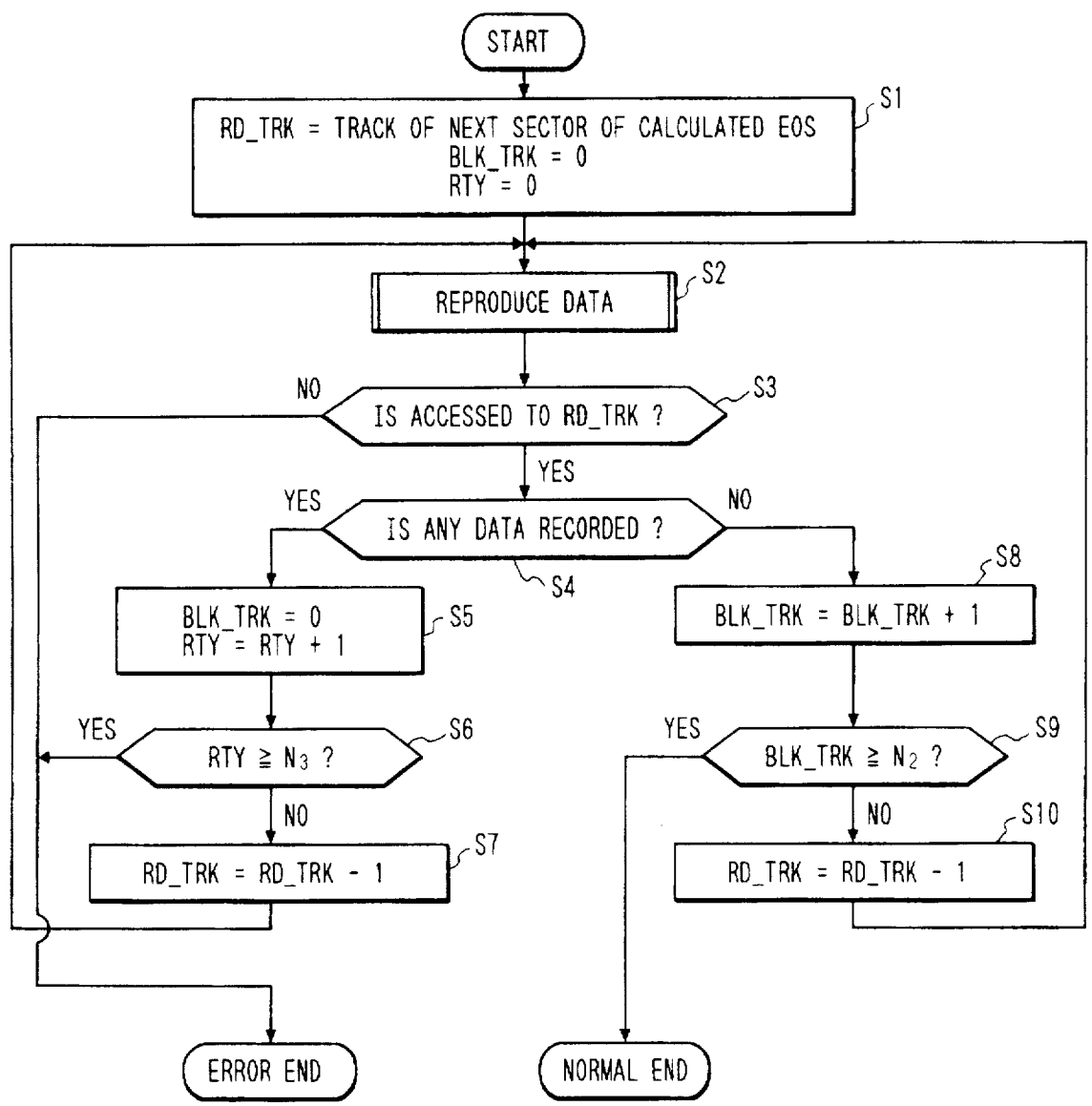
FIG. 9 is a flowchart showing the details of a process for detecting an EOS in the flowchart of FIG. 5.

After completion of the calculation of the EOS, a process for detecting the EOS is performed in order to confirm whether the obtained EOS is correct or not (S4). The detecting process of the EOS is executed in accordance with the flowchart of FIG. 9. Since the processes in FIG. 9 have already been described, the detailed explanation is omitted here. The processes in steps of S2 to S7 in FIG. 9 are repetitively executed and the process for sequentially retrieving the tracks in which no data is recorded from the next track of the EOS obtained by the calculation up to the predetermined number of times $N_3$. In this instance, since the EOS is equal to 0 and the number of retry times is equal to $N_3$, the retry is repetitively performed from the head physical sector address $P_1$ in FIG. 12 and the processing routine is finished as an error when the retry is repeated up to the track of a physical sector address $P_{2N_3}$. When the detecting process of the EOS is finished as an error, a process for recording the system directory is performed (S6). When the EOS can be detected, a process for recording the file data is executed (S7).

In this instance, since the processing routine is finished as an error in the detection of the EOS and the discrimination result in step S5 is NO, the system directory is recorded to the directory section of the optical card (S6). FIG. 13 is a diagram showing the contents of the system directories which are recorded at this time. First, "DIRU" indicative of the system directory is written to the header by the ASCII code. Since it is the first directory, "1" is written to the system directory number. As shown in the embodiment, in the case where the file A is recorded on the optical card and the directory to manage the file A is not recorded, namely, in the case where data is recorded in the areas which are not managed by the directory and the recorded data cannot be substantially accessed, such areas of the data are all handled as defect sectors.

Thus, the start logical sector address in FIG. 13 is equal to "0", the number of management logical sectors is also equal to "0", the start physical sector address is equal to "1", and the number of management physical sectors is equal to $2N_3$. This is because since one track in the optical card is divided into two sectors as shown in FIG. 1, when the areas of $N_3$ tracks which were retried are calculated as the number of sectors, the number of management physical sectors is equal to $2N_3$. Further, since the areas from the head track of the optical card to $(N_3)$th track are handled as defect sectors as mentioned above, as defect information, the defect list 1 such that the defect start address is equal to "1" and the number of continuous defect sectors is equal to $2N_3$ is recorded. The recording process of the system directory in step S6 is completed as mentioned above. The writing once process of the file B which has already been described in FIG. 10 is finished as an error without recording no file data.

The operation in the case where after the optical card in which the system directory has been recorded as shown in FIG. 13 was ejected out, the optical card is again set to the drive 31 and the data of the file B is additionally written once will now be described. In this instance, data is also recorded in accordance with the flowchart in FIG. 10. In FIG. 10, all directories of the optical card are reproduced (S1) and a check is made to see whether the EOD could be normally detected or not (S2). The processes up to this step are the same as those mentioned above. Subsequently, the EOS is calculated from the sector management information of the reproduced EOD (S3). In this case, as shown in FIG. 13, since the system directory in which the start physical sector address is equal to "1" and the number of management physical sectors is equal to $2N_3$ has been recorded, when calculating on the basis of the above contents, the EOS is equal to $2N_3$. When calculating the EOS, a process for detecting the EOS is executed (S4) in accordance with the flowchart of FIG. 9. That is, the processes in steps of S2 to S7 in FIG. 9 are repetitively performed and a process for sequentially detecting the tracks in which no data is recorded in accordance with the order from the track [track of $(N_3+1)$] of the next sector of the sector $2N_3$ is executed. In this instance, since the data of the file A recorded in the optical card is the data of n sectors and n is equal to or larger than $2N_3$ and is smaller than $4N_3$ (the number of tracks is equal to or larger than $N_3$ and is smaller than $2N_3$), when repeating the retry in FIG. 9, the track in which no data is recorded is certainly detected within the $N_3$ retry times. Therefore, the result in step S4 becomes YES while repeating the retry in FIG. 9 and further, as mentioned above, the EOS is decided by confirming that the predetermined number of unrecorded tracks continue from the detected unrecorded track.

Returning to FIG. 10, a check is made to see whether the EOS could be normally detected or not (S5). Since the EOS can be normally detected at this time, the data of the file B is sequentially written once from the next sector of the EOS every one sector (S7). A check is made to see whether the recorded data could be normally recorded or not by a verification (S8). If the data cannot be normally recorded, the processing routine is finished as an error. When the data can be normally recorded, the directories are recorded from the next sector of the detected EOD (S9). It is assumed that the data of four sectors of the file B could be normally recorded without causing any error.

FIG. 14 is a diagram showing the contents of the user directories which are recorded in step S9. First, "DIRU" indicative of the user directory is written to the header. "2" is written to the system directory number because of the second system directory. "1" is written to the user directory number because of the first user directory. Since all of data areas before the data of the file B is recorded are handled as defect sectors, the start logical sector address is equal to "1" and the number of management logical sectors is equal to "4" because the data of the file B has been recorded over four sectors. In this instance, since the head physical sector address to be managed is equal to $(2N_3+1)$, the start physical sector address is equal to $(2N_3+1)$. As a number of management physical sectors, since the areas from $(2N_3+1)$ to n sectors of the file A remain, the data of $(n-2N_3)$ corresponding to those areas and the data of four sectors of the file B are added, thereby obtaining $(n-2N_3+4)$. Further, since all data areas before the data of the file B is recorded are handled as defect sectors, the remaining areas of the file A are recorded as defect information, so that the information is recorded as a defect list 1 in which the defect start address is equal to $(2N_3+1)$ and the number of continuous defect sectors is equal to $(n-2N_3)$. Information such as file name, file size, and the like of the file B is finally recorded as user directory data, so that the recording process of the user directories is finished. When the user directories are recorded, the recording confirmation is executed by performing a verification in a manner similar to the above (S10). When the directory can be normally recorded, it is notified to the host computer 32, thereby finishing the writing-once process of the file B.

As mentioned above, according to the embodiment, in the case where the EOS cannot be detected even if the retry was repeated the predetermined number of times, all sectors in the areas in which the retry was performed are handled as defect sectors and information for managing the sector in which the retry was finally executed as a temporary EOS is recorded. When the optical card is subsequently set to the apparatus, therefore, the start position of the next retry can be instructed by those information, so that the EOS can be certainly detected while repeating the retry at the next time and subsequent times. For instance, in the case where the optical card is erroneously delivered to the outside of the apparatus during the recording of the file or before the recording of the directory after the data was recorded, consequently, no error occurs even if the optical card was set to the apparatus many times, and the file data can be certainly additionally written once to the optical card.

The above embodiments have been explained on the assumption that the data of n sectors of the file A is equal to or larger than $2N_3$ and is smaller than $4N_3$. However, in the case where n is equal to or larger than $4N_3$, since the retry is finished at $4N_3$, $6N_3$, $8N_3$, ... at the next time and subsequent times, it is sufficient to detect the actual EOS by recording the management information indicating that the recording position at which the retry was finally performed is set to a temporary final recording position. Although the example such that two kinds of directories such as user directory and system directory are used has been shown, it is sufficient that the information for managing the recording position at which the retry was finally performed in the data section as a temporary final recording position is recorded irrespective of the format of the directory. Further, as described in FIG. 1, although one track has been divided to two sectors in the data section 10 and one track has been divided to four sectors in the directory section 20 in the optical card, the invention is not limited to the above example. The positions of the data section 10 and directory section 20 are not limited to those shown in FIG. 1. As for the information recording medium, the write-once type optical card has been used as an example. However, the invention is not limited to such a card.

As mentioned above, according to the invention, in the case where the final recording position of the data section cannot be detected even if the retry was repeated a predetermined number of times, by recording information for managing the recording position at which the retry was finally executed as a temporary final recording position is recorded, the final recording position of the data section can be detected at the next time and subsequent times. There is, consequently, an effect such that no error occurs even if the recording medium was set to the apparatus many times, and the file can be certainly additionally written once.

What is claimed is:

1. An information recording method comprising:

a first searching step of searching for a start position of recording on a recording medium on the basis of a directory recorded on a directory section of the medium;

a second searching step of searching for an actual start position of recording by investigating whether data is recorded on the start position of recording searched by said first searching step, and a portion after the start position of recording; and a directory recording step of recording, on said directory section of the medium, and in advance of recording file data, information indicative of a last recorded position investigated by said second searching step when the actual start position of recording cannot be searched in said second searching step.

2. A method according to claim 1, further comprising a step for searching the start position of recording on the basis of said information in said first searching step when the information indicative of the last recorded position is recorded on said directory section.

3. A method according to claim 1, wherein said information indicative of the last recorded position is recorded on the directory as a configuration different from a configuration of a directory which is used by a user.

4. An information recording method comprising:

a first searching step of searching for a start position of recording on a recording medium on the basis of a directory recorded on a directory section of the medium;

a second searching step of searching for an actual start position of recording by investigating whether data is recorded on the start position of recording searched by said first searching step, and a portion after the start position of recording;

a directory recording step of recording, on said directory section of the medium, and in advance of recording file data, information indicative of a last recorded position investigated by said second searching step when the actual start position of recording cannot be searched in said second searching step; and a file data recording step of recording the file information on the medium.

* * * * *

UNITED STATES PATENT AND TRADEMARK OFFICE
CERTIFICATE OF CORRECTION

PATENT NO. : 5,739,519
DATED : April 14, 1998
INVENTOR(S) : Tsuchiya

It is certified that error appears in the above-indentified patent and that said Letters Patent is hereby corrected as shown below:

COLUMN 7:

Line 10, "other," should read --other hand,--.

COLUMN 8:

Line 56, "that" should be deleted.

COLUMN 11:

Line 47, "of S2" should read --S2--.

COLUMN 12:

Line 46, "those" should read --that--.

Signed and Sealed this

Twenty-seventh Day of October, 1998

Attest:

BRUCE LEHMAN

Attesting Officer     Commissioner of Patents and Trademarks